Sept. 27, 1927.  1,643,873
F. E. CARDULLO
TOOL HOLDER FOR PLANERS AND SIMILAR TOOLS
Filed Aug. 18, 1923.  2 Sheets-Sheet 1
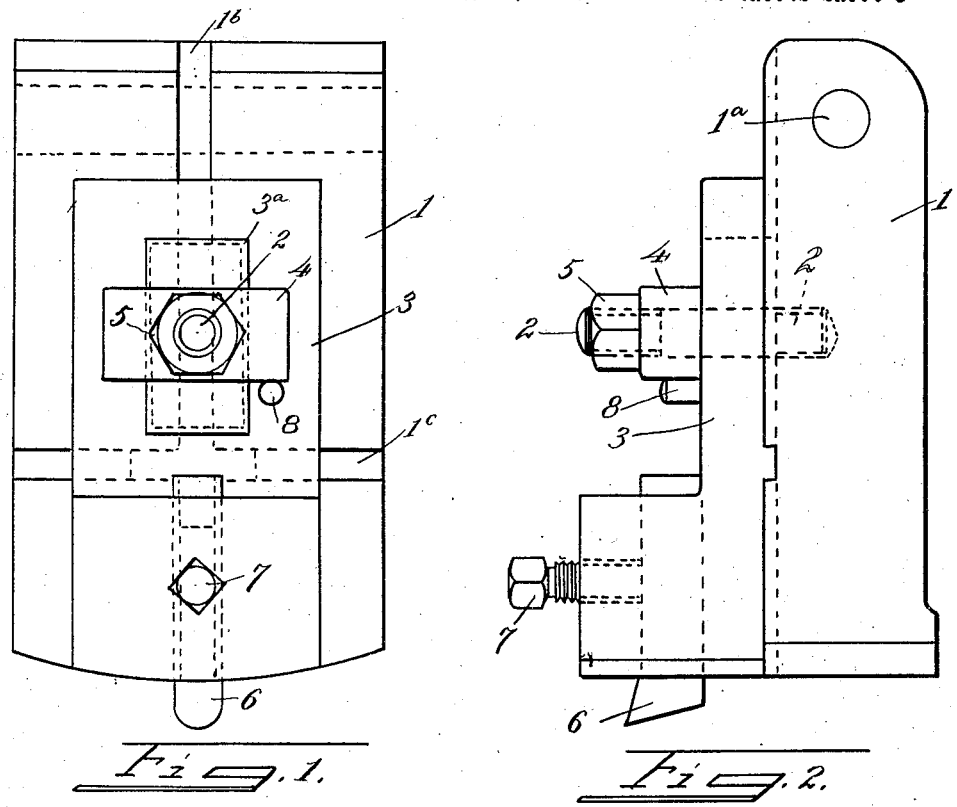
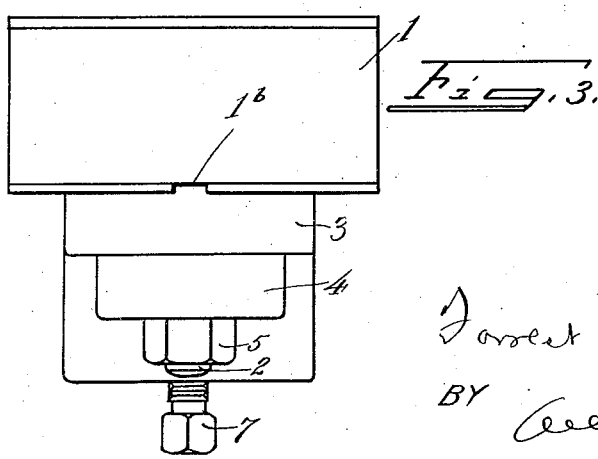
INVENTOR:
Forrest E. Cardullo
BY
ATTORNEYS.

Sept. 27, 1927.   F. E. CARDULLO   1,643,873
TOOL HOLDER FOR PLANERS AND SIMILAR TOOLS
Filed Aug. 18, 1923   2 Sheets-Sheet 2
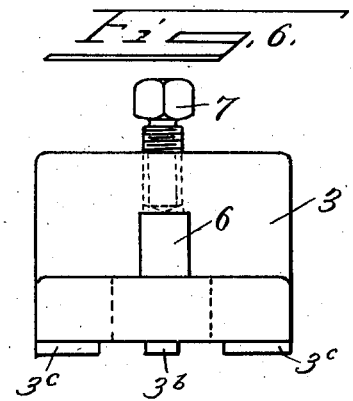
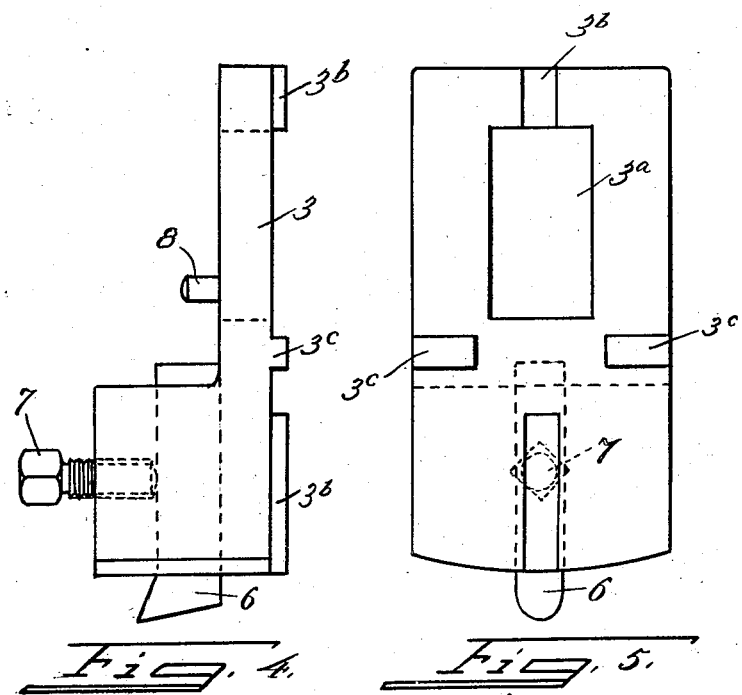
INVENTOR:
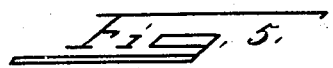
BY
ATTORNEYS.

Patented Sept. 27, 1927.

1,643,873

UNITED STATES PATENT OFFICE.

FORREST E. CARDULLO, OF CINCINNATI, OHIO, ASSIGNOR TO THE G. A. GRAY COMPANY, OF CINCINNATI, OHIO, A CORPORATION OF OHIO.

TOOL HOLDER FOR PLANERS AND SIMILAR TOOLS.

Application filed August 18, 1923. Serial No. 658,083.

The object of this invention is to provide a means for attaching tools to a swinging tool holder, commonly known as a tool block or clapper block, in such a manner that each tool is presented at the proper angle and position for performing its work.

A second object is to make it easy to change from one tool to another, and to reduce to a minimum the time required for tool changing.

Reciprocating machine tools such as planers are commonly provided with tool blocks which are pivoted in such a manner to permit the tool to swing free from the work on the back stroke. The block which swings in this manner, and to which the tool is securely fastened, is commonly called a tool block or clapper block. In certain kinds of work, it is frequently necessary to use a series of tools each one adapted to perform one particular operation of a series. When the same series of operations is performed over and over again on successive pieces of the same kind, it is desirable that means be provided, whereby each tool, when it is fastened in place to perform its work, will be automatically placed in the proper position. Furthermore, it is desirable that a tool may be removed and replaced with a minimum of time and effort.

In turret lathes this is accomplished by mounting the several tools on a revolvable turret, so that when the turret is indexed to a certain position, a certain tool is presented in exactly the proper cutting position, and when the turret is indexed into a second position, a second tool is presented in exactly the proper position to perform its work.

This method is not practical in the case of machine tools like a planer where the tools must swing free on the back stroke. It is necessary either to mount the turret, which is a heavy part carrying a number of tools, on a very large clapper block, or else to make the turret much larger than it would otherwise be, in order to carry a number of clapper blocks, each one carrying its individual tool.

In order to obtain the same advantages without the use of very large and heavy parts, I propose to use the device illustrated and described below.

In the drawings:

Figure 1 is a front view of a clapper block with the device attached.

Figure 2 is a side view of this block and device.

Figure 3 is a top view of the block and device.

Figure 4 is a side view of the tool holder.

Figure 5 is a back view of the tool holder.

Figure 6 is a top view of the tool holder.

In these drawings, 1 is a clapper block which swings on a pin inserted in the tapered hole 1ª. In the face of this block are formed grooves 1ᵇ and 1ᶜ. Screwed into this block is stud 2. Against the face of this block is placed tool holder 3. On the back of tool holder 3 are milled tongues 3ᵇ and 3ᶜ which engage with grooves 1ᵇ and 1ᶜ. In tool holder 3 is formed a rectangular opening 3ª through which stud 2 projects, when the tool holder is in place. The tool holder is held against the clapper block by a rectangular clamp or button 4, which slides over stud 2. When this clamp is in the position shown in full lines in Figure 1, nut 5 is screwed down firmly against it, and it holds the tool holder 3 firmly in place against clapper block 1. If, however, nut 5 is unscrewed slightly, button 4 may be revolved 90 degrees into the position shown by the dotted lines in Figure 1. The tool holder 3 may be removed since button 4 is slightly smaller in size and of practically the same shape as opening 3ª. The same tool holder or another tool holder may then be slipped into exactly the same place, since the tongues will engage the grooves in the clapper block. If now the clamp 4 be rotated 90 degrees into the position shown by the full lines, a slight turn of nut 5 will quickly clamp the second tool holder in exactly the same position as the first. The tool holder may be provided with any suitable means for holding the tool in place. The tool holder shown is provided with a broached hole in which is placed tool 6 which is held fast by set screw 7. This tool may be of any desired form, and the tool holder arranged to hold it at any desired angle, according to the nature of the work to be performed.

In order that clamp 4 may not be turned out of position when the nut is tightened, pin 8 is inserted in tool holder 3 to limit the rotation of the clamp about the stud, so that when the nut is turned in a clockwise direction, so as to clamp the tool holder in place the clamp will not be turned too far.

It will be seen that by providing a series of tool holders, each containing a properly adjusted tool, repetition work is greatly facilitated, since when such a tool holder is fastened in place, the tool that it carried will be in the correct position for performing its work.

It is obvious that various means differing from those shown may be employed for holding the tool holder in the required position, and for fastening it to the clapper block. Furthermore, while this device is particularly useful for those machines requiring a clapper box, the tool holder may be mounted directly upon a slide or other tool supporting member, in the manner described for the clapper block. I, therefore, do not wish to confine the invention to the form shown, but to include all forms which are included within the scope of the appended claims.

Having thus described my invention, what I claim as new, and desire to secure by Letters Patent, is:—

1. In combination in a planer, a tool supporting member having engageable surfaces, a tool holder adapted to engage the said surfaces in such a manner as to fix exactly the position of the tool holder relative to the tool supporting member, and means for clamping the tool holder to the tool supporting member, adapted to permit the ready removal and replacement of the tool holder.

2. In combination in a planer, a tool supporting member, a tool holder, means adapted to fix exactly the position of the tool holder relative to the tool supporting member, and means for clamping the tool holder to the tool supporting member, adapted to permit the ready removal and replacement of the tool holder.

3. In combinaton in a planer, a tool supporting member having engageable surfaces, a tool holder adapted to engage the said surfaces in such a manner as to fix exactly the position of the tool holder relative to the tool supporting member, a clamp adapted to hold the tool holder firmly against the tool supporting member, means for holding the clamp to the tool supporting member, and means for tightening the clamp.

4. In combination in a planer, a tool supporting member having engageable surfaces, a tool holder adapted to engage the said surfaces in such a manner as to prevent relative sliding motion between the tool holder and the tool supporting member, and means for clamping the tool holder to the tool supporting member, adapted to permit the ready removal and replacement of the tool holder.

5. In combination in a machine tool, a tool supporting member having grooves formed therein, a tool holder having tongues adapted to engage the said grooves, a stud adapted to project through an opening in the said tool holder, a clamp on the stud adapted to pass through the said opening, when in one position, and to clamp the said tool holder to the tool supporting member, when in another position, and a nut adapted to draw the said clamp against the said tool holder.

6. In combination in a machine tool, a tool supporting member, a tool holder, the said tool supporting member and tool holder having complementary interlocking surfaces adapted to prevent relative sliding movement between the said tool supporting member and the tool holder, a clamp adapted to hold the tool holder against the tool supporting member, and so formed as to permit the ready removal and replacement of the tool holder, means for holding the clamp to the tool supporting member, and means for tightening the clamp.

7. In combination in a machine tool, a swinging block adapted to support a tool, a tool holder to be supported thereon, the said block and tool holder having complementary interlocking surfaces adapted to fix exactly the position of the tool holder relative to the block, a stud adapted to project through an opening in the said tool holder, a clamp on the stud adapted to pass through the said opening when in one position, and to clamp the said tool holder to the swinging block when in another position, and a nut adapted to draw the said clamp against the said tool holder.

8. A device for permitting a machine tool having a swinging tool mounting apron to be arranged for a series of predetermined operations using different tools, comprising the combinaton with a swinging apron, of a series of tool carrying members, in which tools may be adjustably placed, means for detachably securing said members one at a time to the apron and complementary means between the apron and the tool carrying members, whereby the relative positions of the members with the apron when mounted thereon are fixed and predetermined.

FORREST E. CARDULLO.